US010724208B2

(12) United States Patent
Gliniorz et al.

(10) Patent No.: US 10,724,208 B2
(45) Date of Patent: Jul. 28, 2020

(54) METHOD FOR ASSISTING AN EXCAVATOR OPERATOR WITH THE LOADING OF A TRANSPORTATION IMPLEMENT AND ASSISTANCE SYSTEM

(71) Applicant: Liebherr-Mining Equipment Colmar SAS, Colmar (FR)

(72) Inventors: Volker Gliniorz, Breisach am Rhein (DE); Guillaume Bonnetot, Zimmersheim (FR); Oliver Weiss, Ammerschwihr (FR)

(73) Assignee: LIEBHERR-MINING EQUIPMENT COLMAR SAS, Colmar (FR)

( * ) Notice: Subject to any disclaimer, the term of this patent is extended or adjusted under 35 U.S.C. 154(b) by 99 days.

(21) Appl. No.: 15/710,266

(22) Filed: Sep. 20, 2017

(65) Prior Publication Data
US 2018/0087240 A1    Mar. 29, 2018

(30) Foreign Application Priority Data

Sep. 23, 2016 (DE) .................. 10 2016 011 530

(51) Int. Cl.
*E02F 9/20* (2006.01)
*E02F 9/26* (2006.01)
*E02F 3/43* (2006.01)
*G01G 19/08* (2006.01)

(52) U.S. Cl.
CPC ............ *E02F 9/2029* (2013.01); *E02F 3/437* (2013.01); *E02F 9/26* (2013.01); *G01G 19/08* (2013.01)

(58) Field of Classification Search
CPC ......... E02F 3/437; E02F 5/025; E02F 9/2041; E02F 9/2029; E02F 9/2257; E02F 9/26; G01G 19/08
See application file for complete search history.

(56) References Cited

U.S. PATENT DOCUMENTS

| | | | | |
|---|---|---|---|---|
| 8,311,970 B2* | 11/2012 | Mcaree | .................. | E02F 9/226 702/174 |
| 8,755,977 B2* | 6/2014 | Furem | .................... | B65G 67/04 701/50 |
| 9,221,659 B2* | 12/2015 | Fukasu | ....................... | E02F 9/26 |
| 9,605,994 B2* | 3/2017 | Jensen | .................. | G01G 19/08 |
| 9,695,571 B1* | 7/2017 | Ge | ......................... | E02F 3/431 |
| 10,024,710 B2* | 7/2018 | Talmaki | ................. | G01G 23/01 |
| 2012/0290178 A1* | 11/2012 | Suzuki | ................. | E02F 9/2045 701/50 |
| 2016/0146660 A1* | 5/2016 | Larsen | .................. | G01G 19/10 177/1 |
| 2017/0370074 A1* | 12/2017 | Leslie | ....................... | E02F 9/26 |
| 2017/0370075 A1* | 12/2017 | Leslie | ..................... | E02F 9/264 |
| 2018/0051445 A1* | 2/2018 | Hori | ...................... | G01G 19/08 |
| 2019/0106859 A1* | 4/2019 | Frank | ..................... | E02F 3/435 |

* cited by examiner

*Primary Examiner* — Todd M Melton
(74) *Attorney, Agent, or Firm* — Dilworth & Barrese, LLP.; Michael J. Musella, Esq.

(57) ABSTRACT

The present invention relates to a method for assisting an excavator operator with the loading of a mobile transportation implement, in particular heavy-duty truck, by means of the excavator shovel, wherein a loading strategy with the number of excavator loading cycles to be executed for loading the transportation implement is proposed to the excavator operator via an assistance system and/or the current payload distribution on the loading area of the transportation implement is indicated.

18 Claims, 4 Drawing Sheets

METHOD FOR ASSISTING AN EXCAVATOR OPERATOR WITH THE LOADING OF A TRANSPORTATION IMPLEMENT AND ASSISTANCE SYSTEM

BACKGROUND OF THE INVENTION

This invention relates to a method for assisting an excavator operator with the loading of a mobile transportation implement, in particular a heavy-duty truck, by means of the excavator shovel.

In opencast mines with discontinuous mining, the heavy-duty truck (HD truck) represents a suitable transportation implement, in order to transport the overburden layers and the raw material layers away from the mining site to the raw material processing site or deposit. Depending on the structure of the opencast mine, very long distances possibly must be covered for this purpose. In this case, the driving time of the HD truck is very long as compared to its loading time, which is why it is desirable to load the HD truck as precisely as possible to the maximum permissible payload, in order to keep the operating costs of the opencast mine as low as possible and the productivity as high as possible.

In opencast mines with discontinuous mining, either cable excavators or hydraulic excavators are used as loading tool for HD trucks. Both types of machine serve to pick up the material to be removed by means of a shovel or a bucket and convey it into the loading trough of the HD truck. The task of the excavator operator substantially consists in filling the excavator shovel to the optimum excavator payload by suitable control of the machine and in conveying this payload into the trough of the HD truck with one excavator loading cycle. An excavator loading cycle includes filling of the excavator shovel, moving the shovel over the loading area of the HD truck, unloading into the trough of the HD truck and returning the excavator shovel to the digging site. Corresponding to the maximum payload of the HD truck the excavator operator must repeat several excavator loading cycles, in order to completely load the HD truck. To precisely reach the maximum permissible payload of the HD truck, the excavator operator must perform the last necessary excavator loading cycle such that the excavator shovel only is filled exactly such that the target payload of the HD truck is reached.

Furthermore, the excavator operator must perform unloading of the excavator shovel into the trough of the HD truck such that the material is uniformly distributed in the trough. Especially in the case of very coarse, unbroken material individual pieces of rock can non-uniformly form the resultant load in the trough, which can lead to a strong lateral, front- or rear-side inclination of the HD truck. The excavator operator must actively counteract this effect by targeted unloading of the excavator payload. An uneven load distribution on the loading area of the HD truck during the driving operation can lead to the following disadvantages:
- unstable driving behavior/safety hazard for the operator due to tipping hazard of the HD truck
- overload of mechanical components (frame, supporting joints, axles, tires) and consequently premature fatigue or rupture
- extension of the calculated transport time due to overloading of the HD truck, influence on further HD trucks (jam).

With respect to the described excavator/HD truck loading cycle, the productivity and the operating costs of the opencast mine substantially depend on the following features:
- duration of the excavator loading cycle
- degree of utilization of the excavator (ratio of effectively reached payload of the excavator and its maximum permissible payload should be as close as possible to 1)
- degree of utilization of the HD truck (ratio of effectively reached working mass of the HD truck and its maximum permissible working mass should be as close as possible to 1)
- number of excavator loading cycles which are necessary to completely load the HD truck
- necessary maintenance intervals and associated maintenance costs of the machines—by correct load distribution of the payload on the trough of the HD truck, the wear of components such as supporting joints and tires can be reduced decisively. Hence, maintenance costs can be reduced and the availability of the HD trucks can be increased.

The excavator operator hence can decisively influence the productivity and the operating costs of the opencast mine. Without technical aids, he must rely on his experience in the operation of the excavator and in the assessment of the loading state of the HD truck. In particular, the excavator operator must know the target payload of the HD truck and assess the load distribution of the payload on the trough of the HD truck with his own visual perception.

SUMMARY OF THE INVENTION

It therefore is the object underlying the invention to indicate a method for assisting an excavator operator and an assistance system which knows how to overcome the aforementioned problems and ultimately can lead to an increase in productivity of the excavator operation.

This object is solved by a method according to the features herein. Advantageous aspects of the method are the subject of the description herein.

According to the invention it now is proposed to suggest a loading strategy to the excavator operator by means of an assistance system, which indicates the number of excavator loading cycles to be executed for loading of the transportation implement. Alternatively or in addition, the current payload distribution on the loading area of the transportation implement can additionally be detected by means of the method and be indicated to the excavator operator. The provision of one piece of the aforementioned information to the excavator operator already means a distinct simplification of the working operation. The active support of the excavator operator makes a noticeable increase in productivity probable.

Above all, the indication of the required number of excavator loading cycles to be executed, in order to achieve an optimum loading of the transportation implement, offers an additional motivation for the excavator operator to actually reach this goal under optimum work actions. The indication of the load distribution timely informs the excavator operator on an improper loading, whereby the excavator operator easily can take countermeasures, in order to ultimately ensure a uniform load distribution on the transportation implement. The method not only provides for an optimum loading of the transportation implement, but indirectly can reduce the risk of premature wear at the transportation implement.

When reference is made below to excavator shovel, this also applies for any form of excavator attachment, in particular excavator shovel and excavator bucket, for digging and lifting earth material.

The term excavator loading cycle preferably refers to the process of picking up the material into the excavator shovel, lifting the material by lifting the shovel, moving the excavator shovel over the loading area of the transportation implement and rotating the uppercarriage, as well as returning the excavator shovel to the digging site.

Payload distribution is understood to be the distribution of the entire material which the excavator has put down onto the loading area of the transportation implement. The current payload distribution in principle is characterized by the current weight distribution of the loaded material on the traveling gear and in particular allows conclusions as to a possible inclined position of the transportation implement.

According to an advantageous aspect of the invention the assistance system determines the number of excavator loading cycles to be executed in dependence on the target payload for loading of the loading area of the transportation implement. Furthermore, the theoretical excavator shovel payload is determined or taken into account, in order to determine and represent the required number of excavator loading cycles. The target payload represents the desired loading quantity of the transportation implement, can correspond for example to the maximum permissible payload of the transportation implement, and is manually adjustable by the excavator operator. Ideally, a bandwidth of the desired target payload can be configured, within which the actual loading quantity should lie, so that the system can tolerate a minor deviation from the target payload.

The theoretical excavator shovel payload corresponds to a predicted excavator shovel payload per excavator loading cycle. For calculating this theoretical excavator shovel payload, in particular the physical shovel size and an average filling factor of the shovel are taken into account. This average filling factor for example can be specified by the excavator operator and designates the amount of material to be expected, which can be picked up by means of the shovel and can be unloaded on the transportation implement per excavator loading cycle. Furthermore, it is conceivable to take account of the density of the material to be loaded in addition to the calculation of the theoretical excavator shovel payload, as especially in coarse-grained bulk material this can also have an influence on the material weight load actually picked up by the excavator shovel.

It is conceivable that the assistance system provides the excavator operator with a quantitative and/or qualitative specification of the excavator payload to be picked up for the next excavator loading cycle to be performed. This proposal is based on the previously determined loading strategy. Taking account of the previous excavator loading cycles, the assistance system always can make an updated proposal as to the payload with which the excavator shovel is to be loaded in the next excavator loading cycle, in order to ultimately reach the goal of the optimum loading of the transportation implement in compliance with the originally defined loading strategy.

It likewise is conceivable that by means of the assistance system a loading tendency is determined and indicated to the excavator operator. Loading tendency refers to the amount by which the current payload of the transportation implement, i.e. the actual material quantity unloaded on the loading area of the transportation implement, differs from a rated payload according to the excavator loading strategy, i.e. the rated payload at the present excavator loading cycle. It can thereby be signaled to the excavator operator whether the same is on target according to the specified excavator loading strategy or whether there is a need of improvement or even a reduction of the scheduled loading duration is possible.

The current actual payload of the transportation implement, i.e. the actual material quantity unloaded on the loading area of the transportation implement can be determined by the assistance system with reference to the number of excavator loading cycles performed already. The actual excavator payload per excavator loading cycle is determined and used for the calculation of the current payload of the transportation implement.

The actual excavator payload per excavator loading cycle, i.e. the material quantity actually picked up in the excavator shovel, can be calculated for example with reference to internal characteristic quantities of the excavator. For example, the existing pressure level in individual actuators or working cylinders of the excavator or the excavator work equipment here plays a decisive role. These pressure values detected by means of sensors can be used by the assistance system for the calculation of the payload actually picked up. In addition, however, the local position of the excavator shovel or the current position of certain excavator components, such as the excavator arm, the boom, the uppercarriage, etc., also can play a decisive role. Preferably, an inclination value of the boom and/or dipper arm and/or reversing lever and/or uppercarriage is detected and taken into account for the calculation. The same applies for detected pressure values on the ground and/or rod side of a lifting cylinder or the detected rotational speed of the uppercarriage.

At the same time, signals for the excavator control likewise can be taken into account for the calculation of the excavator payload actually picked up.

What is decisive for the determination of the actual excavator payload is the measurement and calculation time. For example, it must be ensured that a calculation of the actual excavator payload is made only after successful completion of the digging operation of an excavator loading cycle. Furthermore, for the exact detection of the actual excavator payload it plays a role whether this is effected during a dynamic movement of the excavator or a quasi-stationary state of the excavator. During a movement of the excavator, in particular of the excavator shovel, dynamic influences distort the calculated payload result. Inertial and frictional forces here play a non-negligible role. It therefore is better to determine the actual payload of the excavator during a quasi-stationary state.

Against this background it is expedient when the assistance system automatically determines the appropriate time for the detection of the sensor values and for the calculation of the actual excavator payload. Furthermore, it is imaginable that a determination of the actual excavator payload can be made both during a dynamic state and during a quasi-stationary state of the excavator.

A dynamic state can exist, for example, when after a completed digging operation the uppercarriage of the excavator is rotated into the corresponding emptying position above the transportation implement. During this rotary movement, for example, a calculation of the payload can be executable. A quasi-stationary state of the excavator for example exists when after a completed digging operation the excavator shovel initially has been lifted, but a standstill of the excavator occurs at times, for example because the transportation implement must be newly positioned or the excavator operator takes a short break.

Under optimized working conditions, however, a quasi-stationary state rarely is reached. Against this background it is expedient to optimize the determination of the payload within dynamic phases of movement. When calculation results for an individual loading cycle with an identical material quantity picked up are available both during a dynamic and a quasi-stationary state phase of the excavator, it is possible to determine the influence of dynamic effects on the result with reference to the calculated actual payload data. In particular by comparison of the two payload values can the influence of these dynamic effects be determined and can a correction value for succeeding excavator loading cycles be determined and stored correspondingly. This correction value can then be taken into account for the succeeding excavator loading cycles during the determination of the actual payload.

Furthermore, it is imaginable that an automatic calibration of the payload determination of the excavator shovel can be made by this method. For example, the actual zero payload weight of the excavator shovel can vary due to occurring wear phenomena or material residues on the excavator shovel. To be able to cover these effects and compensate the same for the succeeding calculation of the excavator payload, it is desirable to cyclically execute several zero payload determinations of the excavator shovel. These calculations in particular are made when the assistance system recognizes an empty excavator shovel, for example directly after emptying the excavator shovel on the transportation implement, which for example can be recognized with reference to the emitted control signals of the excavator control system.

Deviations of the individual zero payload calculations then for example define a correction value which can be taken into account for succeeding calculations of the actual excavator payload.

For the detection and determination of the actual payload of the transportation implement it is necessary that such excavator loading cycles with emptying of the excavator shovel onto the transportation implement can be distinguished from excavator loading cycles without emptying onto the transportation implement. For example, when the excavator operator merely rearranges material picked up or checks other settings of the machine by making trial runs. By an automatic recognition of excavator loading cycles, which actually lead to emptying on the transportation implement, it is ensured that only those loading cycles are taken into account for the calculation of the actual payload of the transportation implement. A recognition for example can be made with reference to executed movement profiles and/or the actual excavator payload and/or the current position of the excavator or individual excavator components.

According to an advantageous aspect of the method the loading strategy is updated after each executed excavator loading cycle, in particular by taking account of the previously effectively realized total excavator payloads over all preceding excavator loading cycles. The updated loading strategy can be indicated to the excavator operator.

Beside the simple indication of the load distribution on the transportation implement it can also be imaginable that in dependence on the current payload distribution on the loading area of the transportation implement a suitable emptying position is indicated to the excavator operator for the next excavator loading cycle, in order to achieve a compensation of the unfavorable payload distribution.

It likewise is conceivable that the assistance system automatically intervenes in the excavator control upon detection of an unfavorable payload distribution and supports or partly or fully automatically executes emptying of the excavator shovel at the determined emptying position.

The payload distribution on the loading area of the transportation implement for example can be determined from measured pressures within the traveling gear of the transportation implement. In particular, the measured gas and/or oil pressures of the individual shock absorbers of the traveling gear of the transportation implement serve as indicators in this respect. Alternatively or in addition, an inclination sensor can additionally be installed, which calculates the inclination of the transportation implement with respect to a longitudinal and/or transverse axis of the vehicle. On the basis of this sensor information an unfavorable payload distribution possibly can be recognized with reference to a possible inclination of the vehicle with respect to the horizontal and based thereon a suitable emptying position can be defined for the excavator loading cycle to be performed.

The determination of an unfavorable payload distribution and/or a suitable emptying position for the succeeding excavator loading cycle preferably can be carried out in the transportation implement or alternatively at least partly in the excavator. For this case, however, it is necessary that the necessary information, in particular the detected sensor values, are provided to the excavator via a communicative connection between the two implements. What is conceivable here is the use of a wire-bound or wireless communication connection, for example on the basis of WLAN, mobile radio, Bluetooth or RFID or another suitable radio technology.

In an advantageous aspect of the invention it furthermore is desirable that the excavator automatically recognizes the transportation implement to be loaded, in particular automatically obtains information with respect to the maximum permissible payload of the transportation implement. A corresponding recognition likewise can be made via a radio-based communication between the two implements. For example, the transportation implement can be identified via a corresponding electronic identifier, preferably in the form of an RFID transponder, which is automatically detectable by the excavator when the transportation implement directly approaches the receiving area of the excavator. Via the determinable distance of the transmitting transportation implement to the excavator it can also be recognized by the assistance system which one of the transportation implements located in the receiving area actually is provided for loading by the excavator.

In addition, on the basis of the aforementioned information, in particular the detectable payloads of transportation implement and excavator, an automatic creation of one or more statistics on the productivity of the excavator can be made. The same can be deposited for example in the vehicle and be stored for future retrieval, possibly via an interface provided for this purpose. Such statistics in particular make statements on the effective excavator payload per excavator loading cycle and/or the effective payload of the transportation implement per loaded transportation implement and/or on a arithmetic mean of the sum of the effective excavator payloads per excavator operating hour and/or an arithmetic mean of the number of excavator loading cycles for reaching the rated payload of a transportation implement and/or the number of transportation implements loaded per excavator hour and/or the sum of the effective excavator payloads.

Beside the method according to the invention, the present invention also relates to an assistance system which includes the corresponding technical means for carrying out the method according to the invention. Accordingly, the assistance system is characterized by the same advantages and properties as they have already been explained above with reference to the method according to the invention. A repetitive description therefore is not necessary. It is imaginable that components of the assistance system are distributed either completely into the excavator or the transportation implement or alternatively are distributed on both implements. In this case, a communicative connection between transportation implement and excavator is absolutely necessary.

BRIEF DESCRIPTION OF THE DRAWINGS

The invention likewise relates to an implement, in particular an excavator, preferably a cable-operated or hydraulic excavator, or a heavy-duty truck, comprising an assistance system or components of the assistance system according to the invention.

Further advantages and properties of the invention will be explained in detail below with reference to an exemplary embodiment illustrated in the Figures, in which.

DESCRIPTION OF THE PREFERRED EMBODIMENTS

Figure 1:
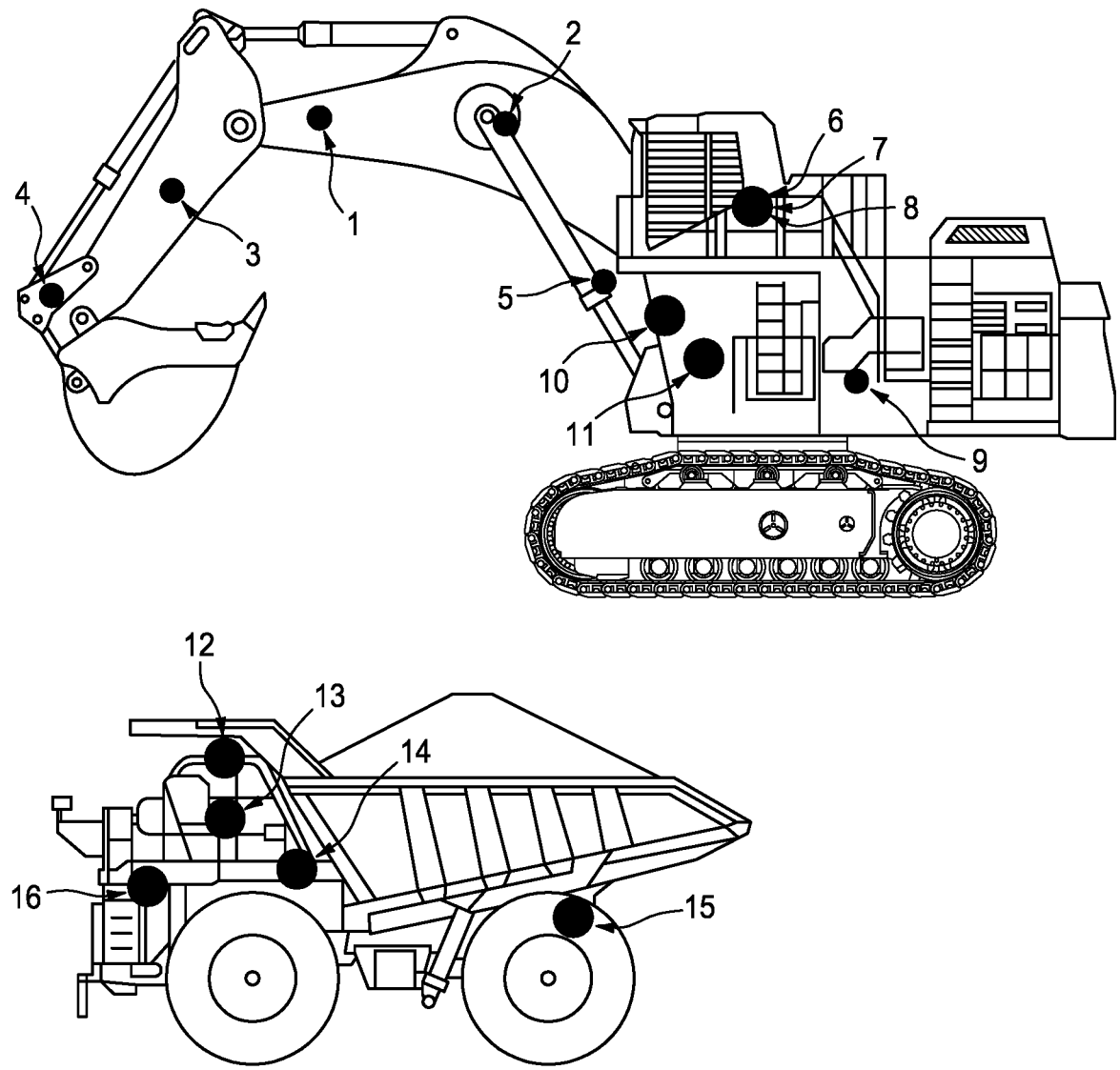
FIG. 1: shows an overview of the distributed arrangement of the individual components of the assistance system according to the invention within a hydraulic excavator or a heavy-duty truck in the form of a dumper.

In the following, the functions of the assistance system will be described more exactly with regard to their modes of operation and their technical concept. For this purpose, FIG. 1 shows machine components which can be used by the assistance system for assisting the excavator operator. It can be the case that not all components are necessary for one application, as either the machines already are provided with such components, which then are used for the realization of this assistance system, or as only parts of the assistance system are to be realized. FIG. 1 likewise illustrates that the assistance system at least in part is based on components which are installed on the HD truck to be loaded by the excavator.

The excavator includes an inclination sensor 1 on the boom, a pressure sensor 2 on the bottom side of the lifting cylinder, an inclination sensor 3 on the dipper arm, a further inclination sensor 4 on the reversing lever, and a pressure sensor on the rod side of the lifting cylinder. A rotational speed sensor 9 can measure the rotational speed of the uppercarriage, the inclination of the uppercarriage is detected by means of the inclination sensor 11.

For executing the assistance software, a computer 6 is available on the excavator. The information of the assistance system can be indicated to the excavator operator via the display 7. For the excavator control, at least one joystick 8 is available. Via the radio module 10, a radio connection to a heavy-duty truck can be established.

On the side of the heavy-duty truck, there is likewise provided a computer 12 for executing a part of the assistance functions. The radio module 13 forms the counterpart to the radio module 10 of the excavator. Pressure sensors 15 on the shock absorbers provide for a load distribution measurement; this is supported by the inclination sensor 14 which detects an inclination of the loading area or trough with respect to the horizontal. An RFID tag 16 serves the unambiguous identification of the heavy-duty truck. The RFID tag can be read out by means of the radio module 10 of the excavator or an additional receiving unit.

In the following, individual functions of the assistance system to support the excavator operator will be explained in detail:

1. Function 1—Automatic Determination of a Loading Strategy a) Functional Description:

The assistance system can automatically create a loading strategy for the HD truck to be loaded and with reference to the same inform the excavator operator about the momentary lead or lag with respect to this loading strategy during the entire loading operation:

The loading strategy can be expressed by indicating:

i. the excavator loading cycles still necessary for completely and precisely loading the HD truck up to its maximum permissible payload ii. the quantitative and qualitative specification concerning the necessary payload of the excavator for the excavator loading cycle to be performed next, in order to comply with the loading strategy iii. the loading tendency, which represents the deviation of the payload already loaded into the trough of the HD truck from the expected payload of the HD truck The automatic determination of the loading strategy can again be adapted automatically during a HD truck loading operation after each performed excavator loading cycle. The effectively realized excavator payloads of the past excavator loading cycles can be taken into account. Finally, the changed loading strategy can again be indicated to the excavator operator. This continuous process will support the excavator operator in designing the following excavator loading cycles such that the maximum HD truck payload can be reached with the smallest number of excavator loading cycles.

b) Concept for the Technical Realization:

The assistance system can be provided with a software for the determination of the loading strategy, which processes the following input information:

i. Momentary HD truck payload: The assistance system can automatically calculate the momentary HD truck payload. This calculation results from the determined excavator shovel payloads which have been identified as productive excavator loading cycles (see the following explanations for Function 5).

ii. Target payload of the HD truck: The assistance system can receive and process data on the target payload of the HD truck. These data for example can be deposited in the assistance system by manual input during the initial commissioning. It can also be the case, however, that the HD truck to be loaded sends these data to the assistance system on the excavator via a radio connection. (see the following explanations for Function 6).

iii. Bandwidth for target payload of the HD truck: The operator can enter the bandwidth for the target payload of the HD truck by manual input into the assistance system. This bandwidth can be defined as percentage value proceeding from the target payload of the HD truck. The assistance system hence can define from which additional payload of the HD truck the same is to be recognized as completely filled.

iv. Shovel volume of the excavator: By manual input during the initial commissioning of the assistance system, the nominal shovel volume of the excavator can be deposited in the assistance system.

v. Filling factor of the excavator shovel fill: By manual input into the assistance system, the operator can deposit an average value for the filling percentage of the excavator shovel in the assistance system.

vi. Density of the material: By manual input into the assistance system, the operator can enter an average value for the density of the material to be loaded.

With reference to this input information, the software can calculate the following characteristic values for determining the loading strategy:

i. Number of the remaining excavator loading cycles up to complete filling of the HD truck: With reference to the input information on the target payload of the HD truck, the bandwidth for the target payload of the HD truck, the shovel size of the excavator, the average filling factor of the excavator shovel and the density of the material to be loaded, the assistance system can determine in advance what number of excavator loading cycles must be performed, in order to completely load the HD truck. Thus, this number corresponds to a theoretically ideal course of the entire loading phase of the HD truck by the excavator.

ii. The current deviation of the loading state of the HD truck from the theoretically ideal course of the entire loading phase of the HD truck by the excavator: As described already under item i), the assistance system can precalculate the theoretically ideal course of the loading process of the HD truck. After each excavator loading cycle, the assistance system can compare this precalculation with the momentary actual state of the HD truck payload. Resulting therefrom, the assistance system can determine the difference between the prediction of the HD truck payload addition and the actual state of the HD truck payload. The numerical value of this difference can be indicated to the excavator operator as an indicator, in order to inform him on the momentary lag or lead with respect to the theoretically ideal course of the HD truck loading process. This information can encourage the excavator operator to catch up on possible lags with the following excavator loading cycles, in order to completely load the HD truck with the minimum number of excavator loading cycles.

2. Function 2—Automatic Assistance for the Distribution of the Additional Load of the HD Truck a) Functional Description:

The assistance system will automatically recognize that the HD truck, which is loaded by the excavator, is inclined too much as a result of the payload addition. If this is the case, the assistance system will support the excavator operator by a suitable indication, in order to distribute the loads of the following excavator loading cycles in the trough of the HD truck such that the HD truck is inclined less or no longer at all.

For this purpose, the assistance system will obtain and evaluate information on the inclination of the HD truck due to its load. This information for example can be based on the hydraulic pressures in the shock absorbers of the HD truck and/or result from inclination measurements of the HD truck. The assistance system will obtain the corresponding data from the HD truck via a radio data transmission connection. The data exchange between HD truck and excavator will take place continuously during an entire HD truck loading operation, in order to ensure that the excavator operator at any time can obtain the momentary status concerning the inclination and the unloading point on the trough of the HD truck.

When the case occurs that the HD truck is inclined too much as a result of an unfavorable distribution of the payload in its trough, the assistance system will inform the excavator operator and for the next excavator loading cycles indicate to him at which position of the HD truck trough the excavator shovel must be emptied, in order to more uniformly distribute the loads of the HD truck.

The function of the "Automatic assistance for distribution of the additional load of the HD truck" furthermore can be structured such that the assistance system can intervene in the control of the excavator and move the excavator such that the excavator shovel is brought into the suitable unloading position above the trough of the HD truck. This automatic control of the excavator can be based on different operating concepts. It can be the case, for example, that the excavator operator must activate (deflect) the joysticks for the control of the excavator in the required directions of movement, in order to enable the movement of the excavator. Once enabled, a software algorithm of the assistance system correspondingly can control the movements of the excavator (lift, dipper arm, shovel, slewing gear), in order to position the excavator shovel. It can also be the case, however, that only parts of the required sequence of movements can be carried out automatically by the assistance system. For example, it can be the case that only the rotary movement, lifting movement and dipper arm movement of the excavator proceed in an automated way, so that the assistance system automatically moves the excavator shovel into the suitable position above the trough of the HD truck, but emptying of the excavator shovel must be carried out manually by the excavator operator.

Figure 2:
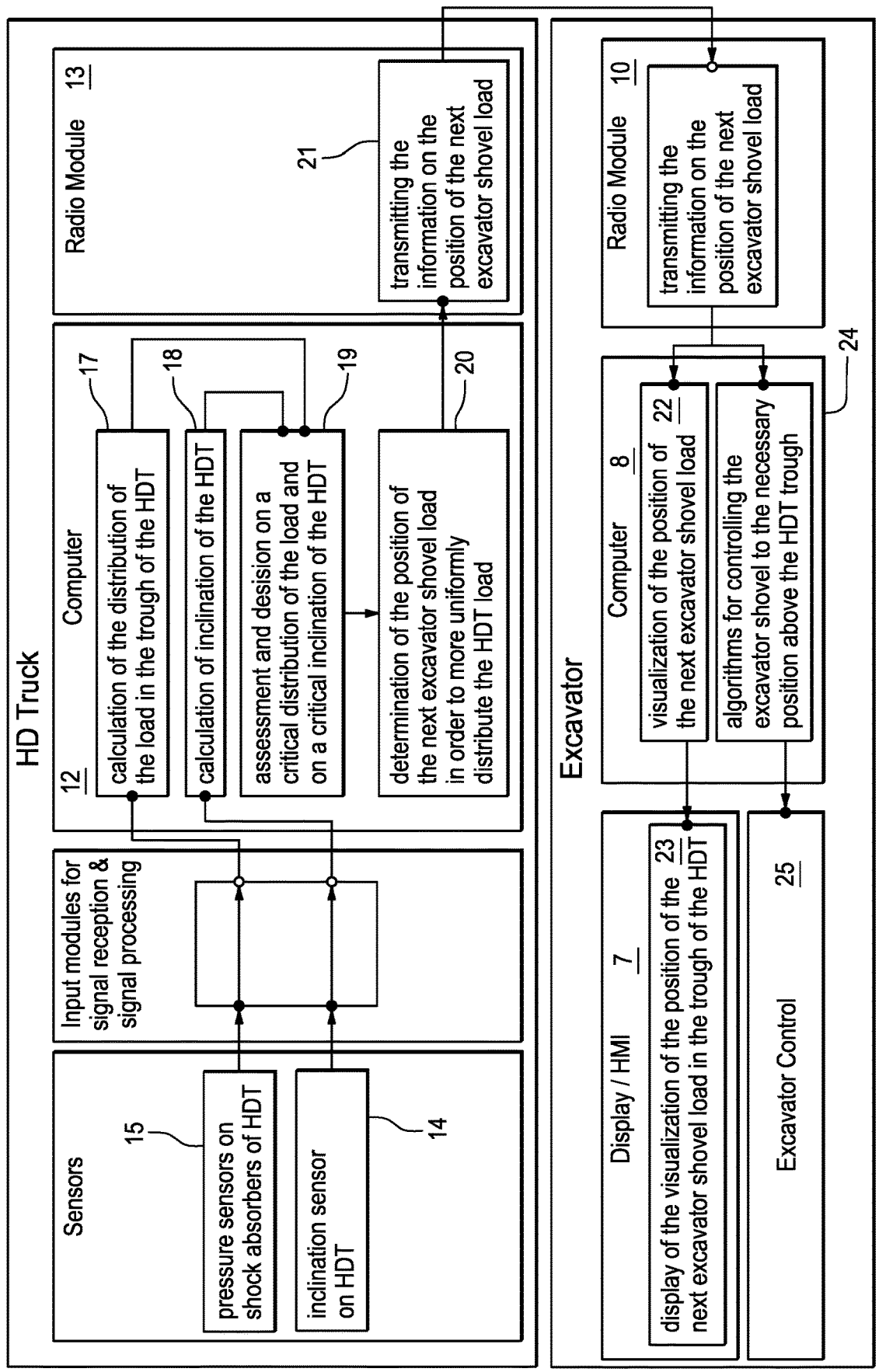
FIG. 2: shows a functional diagram for the realization of the assistance function for distributing the additional load on the trough of the heavy-duty truck.

This execution of the function "Automatic assistance for distribution of the additional load of the HD truck" with automatic control of the excavator accordingly can turn out to be particularly advantageous, as the automatic control of the excavator shovel to the necessary position above the trough of the HD truck can ensure that this unloading position really is reached and the inclination of the HD truck thus can really be compensated correspondingly. Furthermore, this function can relieve the excavator operator with regard to the operation of the machine, which can lead to the fact that the operator becomes less tired or can concentrate already on the coming excavator loading cycle. This function also can lead to the fact that collisions between the excavator and the HD truck can be avoided, so that the accident risk can be reduced and safety can be increased for the machine operators. It also is conceivable that the automatic control of the excavator shovel is carried out such that the sequence of movements between the current position of the excavator shovel and the desired position above the trough of the HD truck is carried out in a time-optimized or energy-optimized way. It can therefore be the case that the necessary time for a loading cycle is reduced and the fuel consumption of the excavator is reduced. Furthermore, the automatic control of the excavator shovel can be useful to automatically adjust the optimum height of the excavator shovel with respect to the trough of the HD truck, so that unloading of the material from the excavator shovel into the trough of the HD truck leads to as little as possible or no damage of the trough of the HD truck. Depending on the application of the excavator, the above-mentioned advantages individually or in combination can lead to the fact that the operating costs of the machine are lowered, the productivity of the machine is increased and the safety of the machine operator is increased.

b) Concept for the Technical Realization:

FIG. 2 shows a possible concept for the technical realization and architecture of the function "Automatic assistance for distribution of the additional load of the HD truck". This function requires that both the HD truck and the excavator be provided with assistance sub-systems.

Accordingly, the HD truck can be equipped with pressure sensors 15 which measure the present oil pressure or gas pressure in each shock absorber of the HD truck. These time-related measurement signals furthermore will be picked up by input modules, in order to be filtered and conditioned correspondingly. Furthermore, the HD truck will be provided with an onboard computer 12. On the onboard computer 12 a corresponding software can calculate the "distribution of the load in the trough" 17.

The HD truck also can be equipped with an inclination sensor system 14. This inclination sensor system 14 can measure the momentary absolute inclination of the HD truck. By means of input modules, the signals of the inclination sensor system 14 can be picked up, filtered and conditioned. On the computer 12, a corresponding software 18 can calculate the current inclination of the HD truck about its longitudinal and transverse axes.

The results of the software mechanisms 17 and 18 as well as the current distribution of the load in the trough of the HD truck and the current inclination of the HD truck about its longitudinal and transverse axes can be used in a further software algorithm 19, in order to automatically assess and decide whether the load is too much non-uniformly distributed in the trough of the HD truck and whether the excavator operator must distribute the loads of the HD truck more uniformly with the next excavator shovel load.

When the software algorithm 19 decides that the inclination of the HD truck is critical and loading of the HD truck is very non-uniform, a further software algorithm 20 can calculate the position of the next excavator shovel load, in order to counteract the inclined position of the HD truck with this next excavator shovel load. The result of the software algorithm 20 and the position of the next excavator shovel load, respectively, can be sent by the computer 12 to an onboard radio module 13. The onboard radio module 13 can be constructed on the basis of various radio technologies, and by way of example the radio module 13 can transmit data via a mobile radio connection (GSM, GPRS, UMTS, LTE or future technology), via a local radio network (WLAN, Bluetooth, etc.) or another radio technology. The radio module 13 can be equipped with a software 21 which provides for obtaining data from the computer 12, in order to subsequently send the same via the corresponding radio technology. The radio module 13 thus can obtain and send the information on the "position of the next excavator shovel load" from the computer 12.

The excavator which loads said HD truck likewise can be equipped with a radio module 10. This radio module 10 just like the radio module 13 of the HD truck can be based on various radio technologies. Thus, the radio module 10 can receive the information on the "position of the next excavator shovel load" and provide the same to the onboard computer 6 of the excavator for further processing.

On the computer 6, a software 22 can pick up the information on the "position of the next excavator shovel load" and process the same correspondingly, so that a visualization of this position on the trough of the HD truck can be built up. This visualization subsequently can be indicated on a display 7 in the cabin of the excavator. In case the HD truck is inclined too much as a result of a strongly non-uniform load distribution in its trough, it hence can be indicated to the excavator operator in what area of the HD truck trough the next excavator shovel must be unloaded, in order to again uniformly distribute the loads on the HD truck.

Furthermore, a software 24 on the computer 6 can pick up the information on the "position of the next excavator shovel load" as input information, in order to therefrom calculate signals for the control of the excavator. The software 24 for example can calculate the necessary trajectory of the excavator shovel, in order to get from the current position of the excavator shovel into the desired position above the trough of the HD truck. The software 24 likewise can calculate the course of the control signals, which are necessary to control the excavator such that the trajectory of the excavator shovel can be executed. This control signal course can be forwarded by the software 24 to the excavator control system 25 in the form of a set-point specification, in order to perform the automatic movement of the excavator.

3. Function 3—Automatic Excavator Shovel Payload Calculation a) Functional Description:

The assistance system will automatically calculate the effective payload of the material picked up in the excavator shovel and use it to fulfill the above described Function 1 and/or Function 2. In this respect, the assistance system will include the following further functions:

i. Automatic recognition of the best time to carry out the excavator shovel payload calculation:

Algorithms will analyze the working cycle of the excavator and recognize therefrom that the loading operation of the excavator shovel (digging operation) is completed and the excavator shovel is moved from the digging site towards the trough of the HD truck (rotate uppercarriage and lift excavator shovel). The automatic excavator payload calculation for example will be carried out during the operation "rotate uppercarriage" and "lift excavator shovel", so that the calculation result is available before unloading the material into the trough of the HD truck. It can also be the case, however, that the automatic excavator shovel payload calculation will be carried out during a quasi-static state of the excavator; this can be the case for example when the excavator shovel has been lifted and the excavator waits for the excavator shovel to be unloaded into a new HD truck.

ii. Automatic excavator shovel payload calculation:

With reference to internal characteristic quantities of the excavator (local position of the excavator shovel in space, hydraulic pressures in the hydraulic cylinders of the work equipment of the excavator, and signals for the control of the excavator) the assistance system will calculate the effective payload in the excavator shovel.

iii. Assessment of the results of the automatic excavator shovel payload calculation with regard to the probable accuracy of the results and selection of the best calculation result:

The automatic excavator shovel payload calculation can be carried out during the selected phase of the working cycle of the excavator on several temporally separate sections. There can be obtained different calculation results. Corresponding algorithms will assess the achieved results of the various calculation phases with regard to their relevance for the performed excavator shovel payload calculation and make a choice. For example, the following cases can occur:

The excavator shovel payload calculation can be carried out repeatedly during a dynamic movement process of the excavator (rotate uppercarriage and lift excavator shovel): In this case, only the result of the last calculation phase will be selected, as at the end of this movement process the speeds of the movement process have stabilized and the influence of the inertial masses and system frictions on the calculation result is small.

The excavator shovel payload calculation can be carried out during a movement process of the excavator in a dynamic and then in a quasi-static phase of movement. In this case, the result of the quasi-static phase of movement will be selected, as in quasi-static phases the calculation result is not distorted by the inertial masses of the excavator equipment and the payload in the excavator shovel. This case example also can include the fact that the excavator shovel payload calculation can be carried out in several dynamic movement sequences and several static movement sequences. As far as all calculation phases belong to one excavator loading cycle, the last static calculation phase will be selected.

iv. Compensation of dynamic effects (inertial forces and frictional forces):

The automatic calculation of the excavator shovel payload will be carried out independent of the dynamics of the excavator during its working process. The calculation process and the calculation result will be performed largely independent of the speeds and accelerations of the excavator and/or the work equipment of the excavator during the excavator working process, and the calculation result will be the same within defined accuracies independent of the dynamics of the excavator loading cycle.

In the application of the excavator and the HD truck in opencast mines it very frequently is the case that the excavator carries out the first excavator shovel fill, before the HD truck to be loaded has moved into the correct loading position or while the HD truck moves into the loading position. This is due to the necessary change of loaded HD truck and empty HD truck in front of the excavator. It very frequently is the case that the excavator operator performs a digging operation with the excavator, in order to fill the excavator shovel, subsequently moves the excavator shovel into the unloading position and must wait for the HD truck to take its correct loading position.

The assistance system will automatically recognize these sequences and perform the automatic excavator shovel payload calculation both during dynamic movement sequences of the excavator (e.g. rotate uppercarriage and lift excavator shovel) and in the quasi-static position of the excavator (waiting phase).

Subsequently, the assistance system will determine the difference from the results of the automatic excavator shovel payload calculation of the dynamic movement sequence and of the static movement sequence. In following excavator loading cycles, this difference will be used by the assistance system as correction value for the calculation of the effective excavator payload, in order to take account of all dynamic influences (inertial forces, frictional forces) in the excavator shovel payload calculation.

Figure 3:
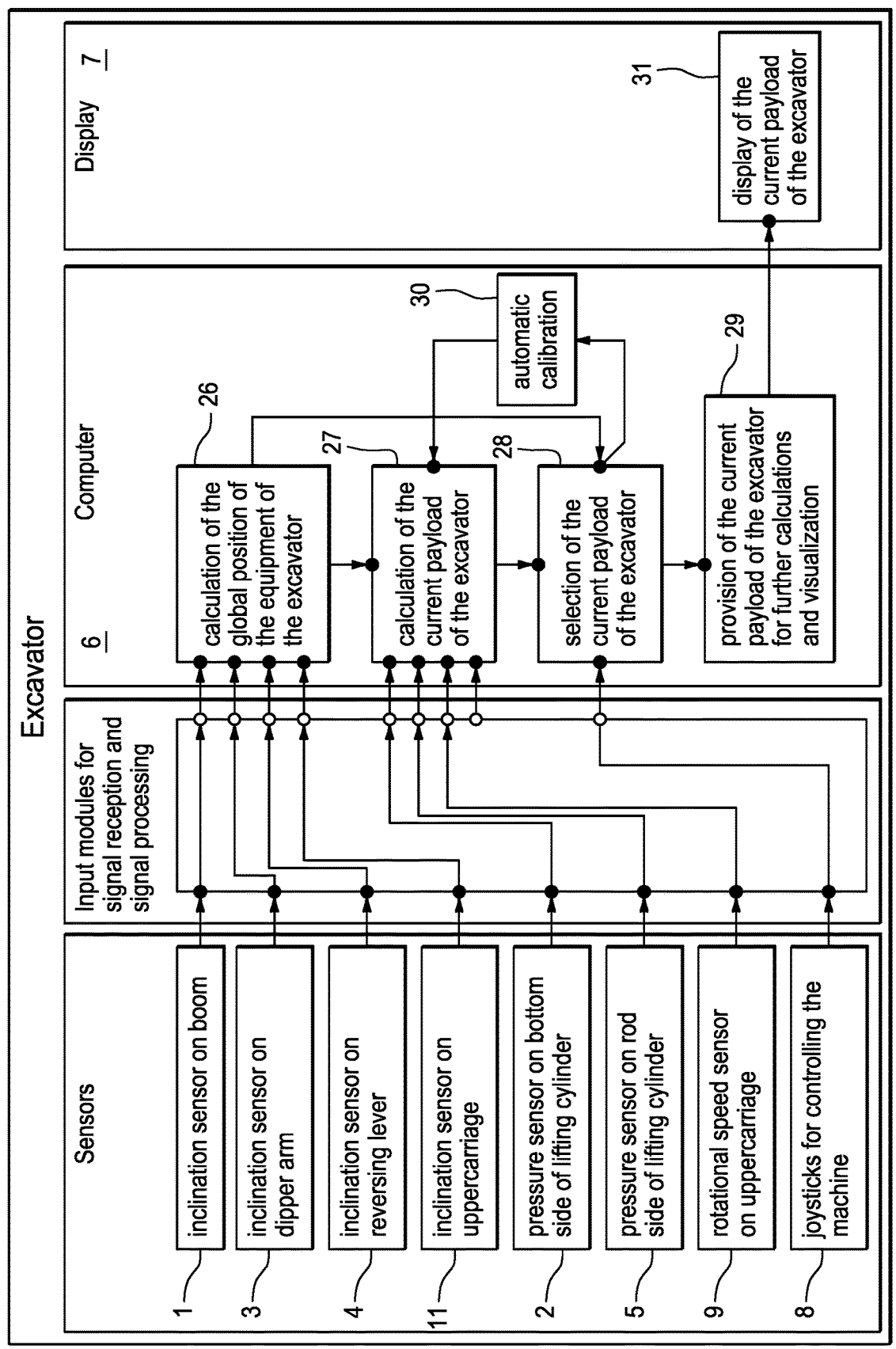
FIG. 3: shows a functional diagram for illustrating the mode of operation for the automatic excavator shovel payload calculation.

The process for determining the correction value will be repeated whenever the described conditions (results of excavator shovel payload calculations are available during an excavator loading cycle for dynamic excavator movements and a quasi-static excavator state) are performed. The assistance system will store the determined correction values for a defined period or form the arithmetic mean from the obtained series of correction values. Accordingly, the arithmetic mean of the correction factors will be used for further excavator loading cycles with automatic excavator shovel payload calculation.

b) Concept for the Technical Realization:

FIG. 3 shows a possible concept for the realization of the automatic excavator shovel payload calculation. This reveals that the excavator can be equipped with the following sensor system.

An inclination sensor 1 which determines the global inclination of the boom. This inclination sensor 1 can be constructed either on the basis of an accelerometer or on the basis of the combination of an accelerometer in conjunction with a rotational rate meter.

An inclination sensor 3 on the dipper arm, which determines the global inclination of the dipper arm.

An inclination sensor 4 on the reversing lever, which determines the global inclination of the reversing lever. This inclination sensor 4 alternatively can also be mounted on the connecting tab between reversing lever and bucket. From the inclination of the corresponding component, the inclination of the bucket finally can be inferred.

An inclination sensor 11, which determines the global inclination of the uppercarriage.

A pressure sensor 2, which is mounted in the hydraulic line towards the bottom side of the lifting cylinder and measures the current hydraulic pressure of the bottom side of the cylinder.

A pressure sensor 5, which is mounted in the hydraulic line towards the rod side of the lifting cylinder and measures the current hydraulic pressure of the rod side of the cylinder.

A rotational speed sensor 9 on the uppercarriage, which can measure the momentary rotational speed of the uppercarriage.

A sensor system 8, which measures the deflection of the joysticks for the control of the excavator. These signals of the two control joysticks provide information on the current operating wish of the excavator operator.

Furthermore, the assistance system can be provided with input modules which pick up all necessary signals of the sensors, condition the same correspondingly, filter the same and provide them to the computer 6 for further processing.

On the computer 6 a software 26 can be present, which initially picks up the processed signals of the inclination sensors 1, 3, 4 and 11 and therefrom calculates the global position of the excavator shovel.

Furthermore, a software 27 can be present on the computer 6, which uses the position of the excavator shovel calculated by the software 26 as input quantity and in addition uses the current signals of the sensors 2, 5, 9 and 8, in order to calculate the current payload of the excavator shovel.

Figure 4:
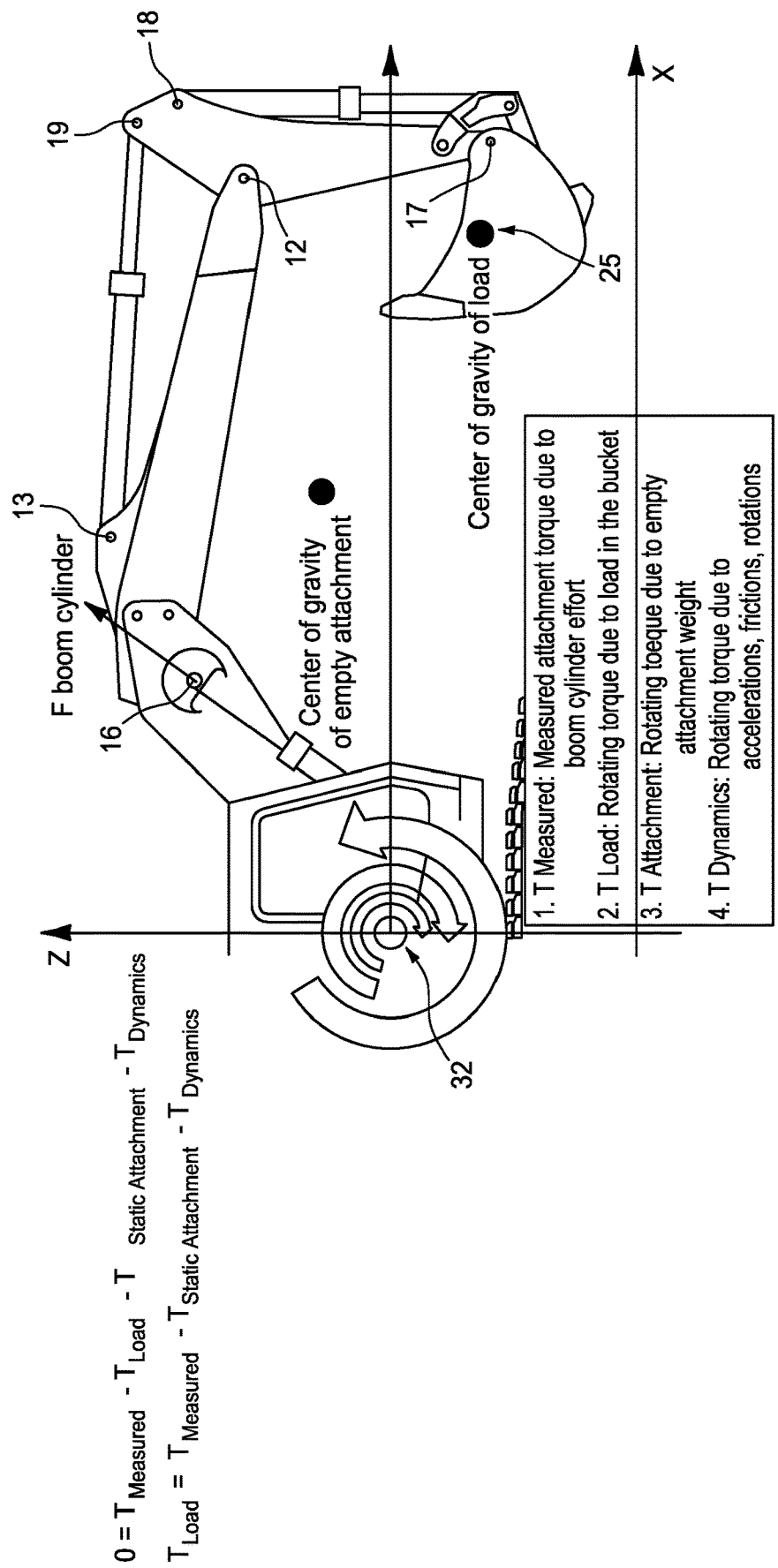
FIG. 4: shows a graphical representation of the calculation principle for the current excavator shovel payload calculation.

The calculation of the current excavator shovel payload can be based on the following principle. The calculation principle is schematically shown in FIG. 4. About the pivot point 32 of the excavator equipment a balance of the existing torques can be drawn up. The torques existing at the pivot point 32 can be assumed as follows:

$$0 = T_{Measured} - T_{Load} - T_{Static\ Attachment} - T_{Dynamics}$$

$T_{Load}$ corresponds to the torque which is obtained as a result of the mass in the excavator shovel and the distance of the mass in the excavator shovel in X-direction to the pivot point 32. From this torque the mass in the excavator shovel can be obtained.

$T_{Static\ Attachment}$ corresponds to the torque which is obtained as a result of all masses of the individual components of the work equipment. This torque can be calculated by knowing the mass of the individual components (boom, dipper arm, bucket, lifting cylinder, dipper arm cylinder, bucket cylinder, etc.) and the centers of mass in space.

$T_{Dynamics}$ corresponds to a torque which combines all forces as a result of dynamic movements of the work equipment. For example, in $T_{Dynamics}$ a torque about the pivot point 32 can be calculated, which is obtained due to the rotary movement of the uppercarriage about its axis of rotation. As a result of this uppercarriage rotary movement centrifugal forces act on the components of the work equipment, which are applied in the center of gravity of each individual component.

Furthermore, in $T_{Dynamics}$ torques can be taken into account, which are obtained due to frictions between moving parts of the work equipment. Such frictions for example can occur in the hydraulic cylinders, as soon as the same are moved.

$T_{Measured}$ corresponds to the torque which the lifting cylinder drive must apply, in order to hold or move the excavator equipment. This torque can be calculated from the momentary forces of the lifting cylinder and the global position of the excavator equipment. The momentary forces of the lifting cylinder can be calculated from the measured pressures on the bottom side and the rod side of the lifting cylinder.

Via this calculation principle, the mass of the payload in the excavator shovel can be extracted. Thus, the calculation software 27 can continuously provide a value concerning the momentary payload of the excavator.

As shown in FIG. 3, a software 28 can be present on the computer 6, which assesses and selects the values concerning the payload of the excavator shovel as calculated by the software 27. The assessment and selection aims at providing the excavator operator and further assistance systems with a value which corresponds to the payload of an excavator loading cycle for the HD truck to be loaded at the moment and which is subject to a high accuracy. Accordingly, the software 28 can be provided with algorithms which for example analyze the joystick signals 8, the signals of the pressure sensors 2 and 5, the signal of the rotational speed of the uppercarriage 9, and the signals of the inclination sensors 1, 3, 4, 11. This analysis can assess whether the excavator momentarily performs loading of a HD truck or whether the excavator performs other work. Furthermore, this analysis can assess whether the excavator has performed a digging phase and is in a working phase for lifting the shovel and turning the uppercarriage towards the HD truck. When the excavator is in such working phase, the software 28 can decide that the current value concerning the "calculation of the current payload" 27 can be provided as result of the weighing process.

The software algorithm 28, however, also can select the value of the "calculation of the current payload of the excavator" with regard to the probably most accurate value of the current payload. For this purpose, the software algorithm 28 can analyze the signals of the sensors 1, 2, 3, 4, 5, 8, 9 and 11 and determine whether a working phase of the excavator, which has been classified as relevant for the selection of a payload value, includes a moment in time which can be assumed as static. All those time sections can be assumed to be "static" in which the excavator does not perform a dynamic movement. For this case it is found that in the calculation of the current payload of the excavator according to the software algorithm 27 the term $T_{Dynamics}$ becomes "zero". As the term "$T_{Dynamics}$" is composed of several components which only are very complex to describe in mathematical terms, it is to be assumed that this term causes deviations in the calculation of the current payload of the excavator. Accordingly, the software algorithm 28 can prefer values of the payload calculation which were obtained under static conditions.

The software algorithm 28 likewise can include a function which provides for determining the difference of a payload value from a static working phase and a payload value from a dynamic working phase, as long as both payload values were calculated within the same working phase of the excavator. The software algorithm 28 subsequently can provide this difference to the calculation algorithm 27, in order to correct the fraction of the dynamic torque of the torque balance about the pivot point 32 of the work equipment. The accuracy of the "calculation of the current payload of the excavator" 27 can be increased therewith.

For further calculation, the module 28 forwards the current payload of the excavator to the module 29 which likewise provides for a visualization of the value via the display 7.

4. Function 4—Automatic Calibrations of the Excavator Shovel Payload Calculation:

a) Functional Description:

The assistance system will perform an automatic calibration of the excavator shovel payload calculation, in order to correct various effects which in use of the excavator can distort the automatic excavator shovel payload calculation.

For example:

i. The use of the excavator inevitably leads to the wear of the excavator shovel. Shovel teeth, tooth lips and protective lips are subject to wear due to the penetration with the material to be removed. The mass of the excavator shovel therefore changes over its period of use. The assistance system will automatically recognize this effect and correct the excavator shovel payload calculation by means of the automatic calibration.

ii. It may be the case that the material remains adherent in and/or on the excavator shovel. This particularly frequently occurs in use in frozen, icy soils. This effect likewise leads to a change of the mass of the excavator shovel. The assistance system will automatically recognize this effect and correct the excavator shovel payload calculation by means of the automatic calibration.

iii. Long-term influences (fatigue, wear) on the used sensor system can lead to deviations of the calculation result. The assistance system will automatically recognize these effects and correct the excavator shovel payload calculation by means of the automatic calibration.

b) Concept for the Technical Realization:

The functional diagram in FIG. 3 shows that the assistance system can be provided with a software algorithm 30 which evaluates the results of the algorithm 28. The algorithm 28, respectively, can perform an analysis of the excavator movements and the current state of the excavator, which provides information as to whether the excavator is loading a HD truck or performs other work. The algorithm 28 likewise can find out whether the excavator performs any movements or is at standstill. The software algorithm 30 accordingly can combine the information on the state of movement of the excavator with the results of the continuous calculation of the payload of the excavator 27. From this information, the software algorithm 30 can derive the following scenarios:

Scenario 1:
i. The excavator has taken a static position and is not moved for a short period. This very frequently occurs when the excavator must wait for the next HD truck.
ii. The excavator shovel is not filled with material.
iii. The excavator shovel has not been put down on the ground.

Scenario 2:
i. After an unloading operation into the trough of the HD truck the excavator shovel again is moved in direction of the digging site.
ii. The excavator shovel no longer is filled with material.
iii. The excavator shovel has not been put down on the ground.
iv. The work equipment is not lowered.

When one of these scenarios is recognized, the software algorithm will determine the difference of the continuous calculation of the current payload of the excavator 27 to "zero". When a deviation of the calculation result from "0" occurs, the difference to "0" will be used for further calculations of the current payload of the excavator as correction value.

5. Function 5—Automatic Identification of Productive Excavator Loading Cycles and Non-Productive Work Processes a) Functional Description:

The assistance system will automatically recognize and decide whether the excavator performs loading cycles or movements which serve for loading a HD truck or do not serve for loading a HD truck. Loading cycles which serve for loading a HD truck will be identified as "productive excavator loading cycles", as only these work movements of the excavator contribute to the direct productivity of the opencast mine. All other work movements of the excavator serve to prepare the digging site of the excavator or serve for other preparatory and test tasks.

The above-described Function 1 of the assistance system requires the automatic recognition of productive excavator loading cycles and of non-productive work processes, respectively. Function 1 can provide for the assistance system to automatically calculate the payload of the HD truck, wherein this calculation is performed on the basis of excavator payloads which can be assigned to productive excavator loading cycles.

Function 5 hence can avoid that the excavator operator must perform manual inputs at the assistance system while performing excavator loading cycles, in order to assign the determined payloads of the excavator to the payload of the HD truck.

b) Concept for the Technical Realization:

The functional diagram in FIG. 3 shows that the assistance system can be provided with a software algorithm 28 which performs the "selection of the current payload of the excavator".

The software algorithm 28 correspondingly can analyze the results of the software algorithm 26 for the "calculation of the global position of the equipment of the excavator". Furthermore, the software algorithm 28 can analyze the results of the software algorithm 27 and in addition the software algorithm 28 can analyze the signals of the joysticks for the control of the machine.

By means of these analyses the software algorithm 28 can identify whether the excavator performs productive excavator loading cycles or whether it performs non-productive work processes. Correspondingly, with reference to this analysis the assistance system can automatically detect whether the excavator empties its excavator shovel into the trough of a HD truck or whether the excavator otherwise empties the excavator shovel.

By means of the function of the software algorithm 28 the assistance system can do the following:
- Release the excavator shovel payload of the corresponding excavator loading cycle for the determination of the momentary HD truck payload
- Calculate the momentary payload of the HD truck
- Complete and reset the excavator shovel payload calculation for this excavator loading cycle
- Save a data record for this excavator loading cycle
- Track and possibly adapt the loading strategy according to item 1

6. Function 6—Automatic Identification of the HD Truck to be Loaded a) Functional Description:

The assistance system will automatically identify the HD truck to be loaded and use all necessary identification data for realizing Function 1 and Function 2. Accordingly, the assistance system will be provided with a technology which provides for exchanging information on the identity of the HD truck between the HD truck to be loaded and the excavator. This technology can be based on various radio data transmission technologies. The exchange of information will include at least data on the name, the type and the maximum payload of the HD truck.

In use of the excavator it can be the case that several HD trucks are in the vicinity of the excavator. In this case, the assistance system will be able to distinguish between HD trucks which are not directly at loading distance and hence identify the HD truck which momentarily is loaded by the excavator.

b) Concept for the Technical Realization:

As shown in FIG. 1, the excavator can be provided with a general radio module 10. This radio module 10 can be based on different radio technologies.

For example, the radio module 10 can be constructed on the basis of the standardized WLAN technology and receive or transmit data via a local radio network. Standard radio frequencies for local radio networks are standardized in the 802.11 standards of the "Institute of Electrical and Electronics Engineers (IEEE)". Nowadays, there are mostly used radio frequencies of 2.4 GHz or 5 GHz.

Furthermore, the radio module 10 can be constructed on the basis of the RFID technology. Thus, the radio module 10 can emit radio waves which can be picked up by an RFID transponder (tag), modified and sent back to the radio module 10 as response. The radio module 10 in its design as RFID radio module can use various radio frequencies. For example, there can be used radio frequencies in the long-wave range, radio frequencies in the short-wave range, radio frequencies in the decimetric wave range or others.

As shown in FIG. 1, the HD truck likewise can be equipped with a radio module 13. The radio module 13 can have the same properties as the radio module 10 on the excavator.

It can also be the case that the HD truck is equipped with an RFID tag 16, which complies with the technical design of the radio module 10 as RFID radio module.

Accordingly, two concept scenarios can exist, which realize the function of the assistance system for the "automatic identification of the HD truck":

i. Scenario 1:
When both machine types (excavator and HD truck) are provided with radio modules 10, 13 which can receive and transmit data on the basis of the WLAN technology, a local radio network can be set up between the excavator and the HD truck to be loaded, which serves to send information on its type, its maximum payload or other information to the excavator. In addition, the radio module 10 can be provided with software algorithms, which allows to simultaneously set up local networks with WLAN-enabled radio sets. This function can be required when several HD trucks are located in the vicinity of the excavator. For this purpose, the corresponding software algorithms can assess the signal strengths of the radio networks set up, in order to estimate the distance of the respective radio sets to each other. These software algorithms hence can analyze correspondingly which radio partner is located at the smallest distance to the excavator. From this analysis the assistance system can select which HD truck is located at the smallest distance to the excavator and assume that this HD truck is loaded.

ii. Scenario 2:

When the excavator is provided with a radio module which is constructed on the basis of the RFID technology, the HD truck must be equipped with corresponding RFID tags 16. In this scenario, the radio module 10 hence can excite so-called RFID tags 16 in its surroundings via radio waves and receive a response concerning the identity of the RFID tag. The information on the identity of the RFID tag can correspond to the relevant data on the identity of the HD truck (for example HD truck type, HD truck name, maximum payload of the HD truck). Furthermore, the radio module 10 based on RFID technology can be provided with software algorithms which analyze the signal strength of the radio responses of several RFID tags and evaluate the same with respect to the distance between the RFID tags and the radio module 10. This evaluation can lead to the result that an RFID tag is at the smallest distance to the radio module 10. From this information the assistance system can select which HD truck is located at the smallest distance to the excavator and assume that this HD truck is loaded.

7. Function 7—Automatic Creation of Statistics on the Productivity of the Excavator The assistance system can be provided with the Functions 1 to 6. It can be the case that the assistance system includes all the described functions, but it can also be the case that the assistance system only is provided with parts of the Functions 1-6. The individual functions of the assistance system generate data which contain information on the productivity of the excavator. These data can be provided by the individual functions of the assistance system and be stored for further analyses.

The assistance system accordingly can be provided with a software which allows to analyze production-relevant data, which were created and stored by the Functions 1-6, or to convert the same into information relevant for the user.

The productivity of the excavator for example can be expressed by the following characteristic values:

Effective excavator payload per excavator loading cycle
Effective HD truck payload per loaded HD truck
Arithmetic mean of the sum of the effective excavator payloads per excavator operating hour
Arithmetic mean of the number of excavator loading cycles which were performed to fill the HD truck
Number of HD trucks which were filled per excavator operating hour
Sum of the effective excavator payloads The assistance system accordingly can calculate for example the above-mentioned characteristic values by means of a software for the automatic creation of productivity statistics. The software can be provided with the functionality that the user can have the productivity statistics created by the software for a period chosen by himself. Furthermore, the software can offer a function which provides for creating the production statistics for specified defined periods.

The invention claimed is:

1. A method executed by at least one processor for assisting an excavator operator with a loading of a mobile transportation implement by an excavator, comprising:
   determining a loading strategy including the number of excavator loading cycles to be executed for loading the transportation implement;
   informing the excavator operator of the loading strategy;
   determining a current payload distribution on a loading area of the transportation implement; and
   informing the excavator operator of the current payload distribution, and
   wherein the number of excavator loading cycles to be executed is determined based on:
   a target payload for loading the loading area of the transportation implement; and
   a knowledge of a theoretical excavator shovel payload calculated based on an operator specified physical shovel size and operator specified average filling factor of the shovel per excavator loading cycle, and
   wherein the excavator operator configures a bandwidth for the target payload, within which the actual payload of the transport must lie.

2. The method according to claim 1, wherein a theoretical payload of an excavator shovel is determined by taking account of a physical shovel size and/or an average filling factor of the excavator shovel and/or a density of a material to be loaded.

3. The method according to claim 2, wherein a quantitative and/or qualitative specification of a payload of the excavator to be picked up in an excavator shovel is made to the excavator operator for the excavator loading cycle to be performed next, to comply with the determined loading strategy.

4. The method according to claim 1, wherein a quantitative and/or qualitative specification of a payload of the excavator to be picked up in an excavator shovel is made to the excavator operator for the excavator loading cycle to be performed next, to comply with the determined loading strategy.

5. The method according to claim 1, further comprising indicating a loading tendency to the excavator operator, wherein the loading tendency comprises whether and/or in what amount a current payload of the transportation implement deviates from a rated payload at a current excavator loading cycle according to the determined loading strategy.

6. The method according to claim 5, wherein the current payload of the transportation implement is determined based on:
   the number of excavator loading cycles performed already; and
   an actual excavator payload each determined per excavator loading cycle.

7. The method according to claim 6, wherein the actual excavator payload per excavator loading cycle is determined with reference to internal characteristic quantities of the excavator and/or signals for the excavator control, wherein a time for determining the actual excavator payload is specified by taking account of current excavator movements and/or positions, and wherein the time for determining the actual excavator payload includes at least one of a time after a completed load pick-up operation during a movement phase, and a time after previous lifting of the excavator shovel during a quasi-static state.

8. The method according to claim 7, wherein the actual excavator payload is determined both during the movement phase of the excavator and during the quasi-stationary state of the excavator at an excavator loading cycle and by comparing the results the influence of dynamic effects of inertial and frictional forces, on the payload determination is determined, and based thereon a correction value is determined or used for the compensation of dynamic effects during the excavator payload determination of succeeding excavator loading cycles.

9. The method according to claim 6, wherein an automatic calibration is executed for the determination of the excavator payload by regularly executing a zero excavator payload determination at times with emptied excavator shovel, and a deviation between individual zero excavator payload determinations is used as correction value for succeeding regular excavator payload determinations.

10. The method according to claim 6, wherein the at least one processor can distinguish between excavator loading cycles with emptying of the excavator payload onto the transportation implement and excavator loading cycles without emptying of the excavator payload onto the transportation implement with reference to executed movement profiles and/or the actual excavator payload and/or the current position of the excavator or individual excavator components, and for the calculation of the current payload of the transportation implement only excavator loading cycles with subsequent emptying of the excavator payload onto the transportation implement are taken into account.

11. The method according to claim 1, wherein after each excavator loading cycle the loading strategy is automatically updated by taking account of an effectively realized excavator payload of preceding excavator loading cycles and is indicated to the excavator operator.

12. The method according to claim 1, further comprising:
based on the current payload distribution on the loading area of the transportation implement the assistance system, determining a suitable emptying position of the material picked up on the loading area of the transportation implement in the next excavator loading cycle, to compensate an unfavorable payload distribution, and indicates the same to the excavator operator.

13. The method according to claim 12, further comprising:
intervening in the excavator control, to support the excavator operator when approaching the suitable emptying position or to execute partly or fully automated piloting to the emptying position.

14. The method according to claim 1, wherein the payload distribution on the loading area of the transportation implement is calculated from measured pressures on a traveling gear of the transportation implement from measured gas or oil pressures of individual shock absorbers, and/or from a measured inclination value of the transportation implement with respect to a longitudinal and/or transverse axis, on the basis of which an unfavorable payload distribution on the loading area is recognized, and a suitable emptying position is determined as needed for the excavator loading cycle to be performed, and the recognition of an unfavorable payload distribution and the determination of an emptying position is executed in the transportation implement or at least partly in the excavator.

15. The method according to claim 1, further comprising:
automatically recognizing the transportation implement to be loaded when automatically receiving information with respect to a maximum permissible payload of the transportation implement via a communication connection between the transportation implement and the excavator, and the transportation implement is made with reference to received data whether the transportation implement is positioned in direct vicinity of the excavator for loading purposes.

16. The method according to claim 1, further comprising:
automatically creating and providing one or more statistics on productivity of the excavator on the basis of previously determined quantities and/or an effective excavator payload per excavator loading cycle and/or an effective payload of the transportation implement per loaded transportation implement and/or an arithmetic mean of a sum of the effective excavator payloads per excavator operating hour and/or an arithmetic mean of the number of excavator loading cycles for reaching a rated payload of the transportation implement and/or the number of transportation implements loaded per excavator hour and/or the sum of the effective excavator payloads.

17. A system for assisting an excavator operator, comprising:
at least one processor configured to:
   determine a loading strategy including the number of excavator loading cycles to be executed for loading a mobile transportation implement with an excavator; and
   inform the excavator operator of the loading strategy via a communication interface,
wherein the number of excavator loading cycles to be executed determined based on:
a target payload for loading the loading area of the transportation implement; and
a knowledge of a theoretical excavator shovel payload calculated based on an operator specified physical shovel size and operator specified average filling factor of the shovel per excavator loading cycle, and
wherein the excavator operator configures a bandwidth for the target payload, within which the actual payload of transport must lie.

18. A vehicle, comprising the system according to claim 17.

* * * * *